Patented Sept. 5, 1922.

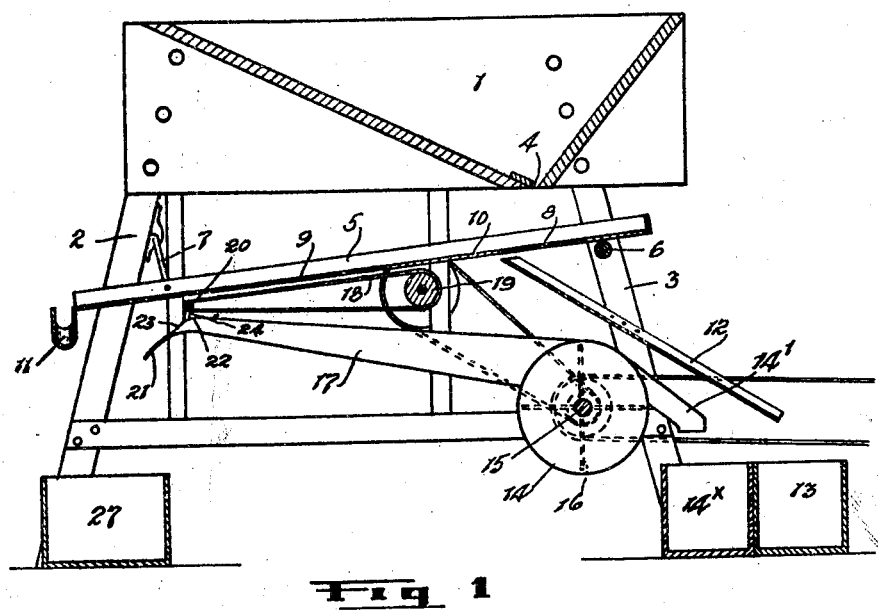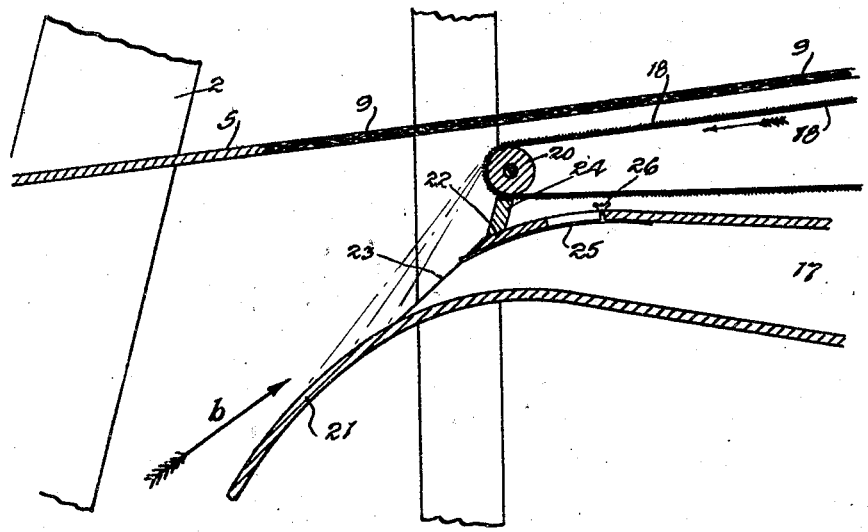

1,428,093

UNITED STATES PATENT OFFICE.

FRANCIS WILLIAM HUMPHRIES AND LORNE EDWIN MACKENZIE, OF CARMAN, MANITOBA, CANADA.

GRAIN-CLEANING MACHINE.

Application filed July 12, 1921. Serial No. 484,261.

*To all whom it may concern:*

Be it known that we, FRANCIS WILLIAM HUMPHRIES and LORNE EDWIN MACKENZIE, both of the town of Carman, in the Province of Manitoba, Canada, have invented certain new and useful Improvements in Grain-Cleaning Machines, of which the following is the specification.

The invention relates to improvements in grain cleaning machines and the object of the invention is to provide a simply constructed machine whereby the grain can be cleaned thoroughly and quickly by the action of a suction blast after the foreign substances such as straw, pebbles and plaster, as are customarily found in grain, have been previously removed.

A further object of the invention is to provide a machine which can be adjusted to take out more or less of the impurities as desired and which operates to effect the separation under the combined influences of gravity and a suction blast.

With the above more important objects in view the invention consists essentially in the arrangement and construction of parts hereinafter more particularly described and later pointed out in the appended claims, reference being had to the accompanying drawing in which:—

Fig. 1 is a longitudinal sectional view through a machine embodying our invention.

Fig. 2 is an enlarged detail vertical sectional view through the forward end of the air flue and parts associated therewith.

In the drawing like characters of reference indicate corresponding parts in each figure.

We have not considered it necessary to enter into a detailed description of the machine framework, driving mechanism and other such major parts as our invention relates entirely to the parts employed for the separation of the grain and not to the details of the machine framework and drives.

The feed hopper 1 is suitably carried at the top of the machine by the front and rear legs 2 and 3. The mixed grain, seeds and foreign material are put into the hopper and fed in the usual manner through the feed hopper opening 4 on to an inclined reciprocating screen 5 having one end mounted on a roller 6 and the other carried by opposing side hangers 7. Any suitable means can be employed for reciprocating or shaking the screen forwardly or backwardly. The screen embodies a rear sieve 8 and a front sieve 9, these being separated by an imperforate bottom piece 10. The sieve 8 is of fine mesh to allow of small seeds, such as pigweed seeds, to go through whilst the sieve 9 is of larger mesh to allow of all other seeds passed forwardly to fall through and the larger foreign material to be passed ahead where it is caught and discharged by the inclined discharge trough 11. A chute 12 collects the seeds passing through the sieve 8 and discharges it into a receiving box 13. 14 is a fan casing containing the fan shaft 14 which carries the fan 16 operating in the casing, the fan being rotated in a direction to effect a suction blast inwardly through the air flue 17. An outlet tube 14' leads from the fan casing and is designed to discharge material from the fan casing into the receiving box 14ˣ. It will be observed that the air flue 17 gradually contracts towards the front end of the machine and terminates beneath the forward end of the sieve 9.

All the above parts are of ordinary construction and with the exception of the air flue are not further described in detail.

Beneath the screen and directly underneath the sieve 9 we locate a belt conveyor 18 carried rearwardly by a comparatively large driven roller 19 and forwardly by a small roller 20, the rollers being suitably mounted on the sides of the machine. The belt is of such a nature that it presents a nap surface so that material lodging on it will have a tendency to cling to the belt. The top side of the belt is spaced slightly from the underside of the sieve 9 and it is driven in the direction indicated by the applied arrow Fig. 2.

The forward end of the air flue 17 is located directly underneath the forward end of the belt and here it will be observed that of the belt and here it will be observed that the underside of the flue terminates in a gradually down curving lip 21 projecting in advance of the roller 20 and considerably in advance of the roller 20 and that the top side of the flue is curved slightly downwardly and terminates as indicated at 22 immediately beneath the roller and that the side walls of the flue present an inclined end as indicated at 23. In this way the flue presents a more or less contracted entrance opening or mouth contained in an inclined plane, the inclined plane being considered as containing the inclined ends 23. The top side of the flue carries a scraper 24 which engages the belt at the underside of the roller and serves to scrape off any material clinging to the belt at this point. The top side of the flue also carries an adjustable curved slide or gate 25 which can be adjusted and set in any adjusted position by the jam nut 26. Here it will be observed that as the gate is moved forwardly the mouth of the flue is decreased in area and that as the gate is extended it presents an arched surface of greater or less area, depending on the adjustment.

When the machine is in use an initial separation of the larger material is made at the screen, the straw, pebbles and such like being carried over the front end of the screen and discharged into the trough 11 and the small seeds, such as pigweed seed, being passed through the sieve 8 and discharged into the box 13. The grain and other seeds not previously separated at the sieve 8 pass through the sieve 9 on to the belt and are carried forwardly by the top side of the belt and the greater majority of them are thrown off the front end of the belt, discharging into the area of the flue suction draft which, owing to the structure of the flue, is in an upward direction indicated more or less by the direction of the applied arrow "b" Figure 2.

It is a well known fact that the various grains, seeds and such like are of a different weight and that wild oats have a beard whilst tame oats are practically smooth surfaced. On account of the varying weights there is accordingly a variation in the direction of travel of the varying grains and seeds when they are discharged at a fairly high velocity from the front end of the screen and further the heavier seeds and grain have not such a tendency to cling to the belt as the lighter ones at the time they are being discharged. This discharging condition is indicated by a number of dot and dash lines extending from the roller 20 to the tongue 21 in Figure 2, the outer dot and dash line indicating, generally speaking, the direction of travel of the heavier material such as wheat, flax and such like and the several inner dot and dash outlines the direction of travel of the other grains and seeds such as barley, tame oats, wild oats and all light seeds, the light seeds following the direction of the innermost dot and dash line.

Wild oats, which have a natural tendency to cling to the nap of the belt, are consequently later in being discharged than tame oats so that they will fall within the line of travel of the tame oats. Any seeds or other material stuck in the nap of the belt will be taken off by the scraper.

All the heavier material discharged such as wheat, flax, barley and tame oats land on the outer part of the lip 21 or that part where the downward curvature is most steep, whilst the other lighter materials if not immediately swept in by the draft, land on the less abruptly down-curving part of the tongue. The down sliding action of gravity on the heavier grains landing on the abruptly downwardly inclining part of the tongue is greater than the updrawing action of the blast so that said good grains slide off the tip of the tongue and are deposited in the collecting box 27. Those lighter grains which land on the less abruptly curved part of the tongue are not acted on as strongly by the action of gravity and are accordingly swept in through the mouth of the flue and discharged through the chute 14' to the box 14$^x$. Obviously the speed of the belt, the shape of the tongue and the velocity of the draft play an important part in the separation process and whilst we have not gone into the action very minutely it is considered that the explanation given will explain the general action which we use.

By adjusting the gate 25 the mouth of the flue is contracted and consequently a greater air suction is produced at the mouth of the flue considering the fan rotated at more or less constant speed. Any increased velocity affected in the air draft will of course draw in more material through the mouth of the flue as the air draft, becoming stronger, overcomes the sliding action of the outer falling grains on the tongue and under the action of gravity.

What we claim as our invention is:—

1. In a grain cleaning machine in combination, a horizontally disposed driven conveyor adapted to receive the grain to be cleaned and discharge the same at one end, said conveyor having a nap surface and a suction air flue having the inlet end thereof located underneath the discharging end of the conveyor and presenting a mouth contained in an inclined plane and the underside thereof extended to provide a gradually down-curving tongue adapted to receive the falling stream of grain.

2. In a grain cleaning machine in combination, a horizontally disposed driven conveyor adapted to receive the grain to be cleaned and discharge the same at one end, said conveyor having a nap surface and a suction air flue presenting a mouth contained in an inclined plane and located beneath the discharge end of the conveyor and with the underside of the mouth presenting a gradually downwardly curving tongue on which the stream of grain falling from the conveyor is discharged.

3. In a grain cleaning machine in combination, a horizontally disposed driven conveyor adapted to receive the grain to be cleaned and discharge the same at one end, said conveyor having a nap surface and a suction air flue presenting a mouth contained in an inclined plane and located beneath the discharge end of the conveyor and with the underside of the mouth presenting a gradually downwardly curving tongue on which the stream of grain falling from the conveyor is discharged and a scraper located on the top side of the flue adjoining the mouth and engaging the adjacent side of the conveyor.

4. In a grain cleaning machine the combination with an endless grain conveyor of a suction flue presenting an inlet disposed beneath the discharge end of the conveyor, and a scraper carried by the flue adjacent said inlet and engaging the conveyor.

Signed at Carman, this 18th day of March 1921.

FRANCIS WILLIAM HUMPHRIES.
    LORNE EDWIN MACKENZIE.

In the presence of—
 GEO. A. GOODWIN,
 ROBERT MALCOLMSON.